United States Patent
Nobori et al.

(10) Patent No.: US 10,484,668 B2
(45) Date of Patent: Nov. 19, 2019

(54) IMAGING APPARATUS, IMAGE PROCESSING APPARATUS, IMAGING SYSTEM, IMAGING METHOD, IMAGE PROCESSING METHOD, AND RECORDING MEDIUM

(71) Applicant: Panasonic Intellectual Property Management Co., Ltd., Osaka (JP)

(72) Inventors: Kunio Nobori, Osaka (JP); Satoshi Sato, Kyoto (JP); Takeo Azuma, Kyoto (JP); Takamasa Ando, Osaka (JP); Tsuguhiro Korenaga, Osaka (JP); Toshiya Fujii, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 196 days.

(21) Appl. No.: 15/431,770

(22) Filed: Feb. 14, 2017

(65) Prior Publication Data

US 2017/0251198 A1 Aug. 31, 2017

(30) Foreign Application Priority Data

Feb. 29, 2016 (JP) .................................. 2016-036754
Aug. 9, 2016 (JP) .................................. 2016-157007

(51) Int. Cl.
*H04N 13/282* (2018.01)
*H04N 13/106* (2018.01)
(Continued)

(52) U.S. Cl.
CPC ........... *H04N 13/282* (2018.05); *G02B 23/02* (2013.01); *G02B 27/46* (2013.01); *G06T 7/11* (2017.01);
(Continued)

(58) Field of Classification Search
CPC ..... H04N 5/7416; H04N 13/25; H04N 13/218
See application file for complete search history.

(56) References Cited

U.S. PATENT DOCUMENTS

| 2008/0019684 A1 | 1/2008 | Shyu et al. |
| 2010/0194926 A1 | 8/2010 | Kang et al. |

(Continued)

FOREIGN PATENT DOCUMENTS

| JP | 6-167564 | 6/1994 |
| JP | 2000-308080 | 11/2000 |
| JP | 2016-001853 | 1/2016 |

OTHER PUBLICATIONS

Takeda Y, Hiura S, Sato K. Fusing depth from defocus and stereo with coded apertures. InProceedings of the IEEE Conference on Computer Vision and Pattern Recognition 2013 (pp. 209-216). (Year: 2013).*

(Continued)

*Primary Examiner* — Clifford Hilaire
(74) *Attorney, Agent, or Firm* — Wenderoth, Lind & Ponack, L.L.P.

(57) ABSTRACT

An imaging apparatus includes an imaging device, a first imaging optical system and a second imaging optical system that form respective input images from mutually different viewpoints onto the imaging device, and a first modulation mask and a second modulation mask that modulate the input images formed by the first imaging optical system and the second imaging optical system. The imaging device captures a superposed image composed of the two input images that have been formed by the first imaging optical system and the second imaging optical system, modulated by the first modulation mask and the second modulation mask, and optically superposed on each other, and the first modulation (Continued)

mask and the second modulation mask have mutually different optical transmittance distribution characteristics.

1 Claim, 12 Drawing Sheets

(51) Int. Cl.
- *H04N 13/189* (2018.01)
- *H04N 13/207* (2018.01)
- *G06T 7/70* (2017.01)
- *H04N 13/00* (2018.01)
- *G06T 7/11* (2017.01)
- *G02B 27/46* (2006.01)
- *G02B 23/02* (2006.01)
- *H04N 13/271* (2018.01)
- *H04N 13/218* (2018.01)

(52) U.S. Cl.
CPC ............ *G06T 7/70* (2017.01); *H04N 13/106* (2018.05); *H04N 13/189* (2018.05); *H04N 13/207* (2018.05); *H04N 13/218* (2018.05); *H04N 13/271* (2018.05); *H04N 2013/0081* (2013.01)

(56) References Cited

U.S. PATENT DOCUMENTS

| | | | |
|---|---|---|---|
| 2011/0267508 A1* | 11/2011 | Kane | G06T 7/529 348/241 |
| 2015/0172631 A1 | 6/2015 | Kasahara | |
| 2017/0026570 A1* | 1/2017 | Shepard | H04N 5/2254 |

OTHER PUBLICATIONS

Ding, Jie, Mohammad Noshad, and Vahid Tarokh. "Complementary lattice arrays for coded aperture imaging." (Year: 2015).*

Xu, Z., Ke, J., & Lam, E. Y. (2012). High-resolution lightfield photography using two masks. Optics express, 20(10), 10971-10983. (Year: 2013).*

Extended European Search Report dated Aug. 21, 2017 in corresponding European patent application No. 17156160.8.

Communication pursuant to Article 94(3) EPC dated Jan. 23, 2019 in corresponding European Patent Application No. 17156160.8.

* cited by examiner (a)

(b)

(a) CALCULATED DISTANCE (b) DISTANCE (TRUE VALUE)

(a) IMAGE OF OPTICAL SYSTEM 101L (b) IMAGE OF OPTICAL SYSTEM 101R (c) IMAGE OF MODULATION MASK 12L (d) IMAGE OF MODULATION MASK 12R (e) OBSERVATION IMAGE (a) GENERATED INPUT IMAGE $I_1$ (b) GENERATED INPUT IMAGE $I_2$ (c) CALCULATED PARALLAX IMAGE (d) CORRECT PARALLAX IMAGE

IMAGING APPARATUS, IMAGE PROCESSING APPARATUS, IMAGING SYSTEM, IMAGING METHOD, IMAGE PROCESSING METHOD, AND RECORDING MEDIUM

BACKGROUND

1. Technical Field

The present disclosure relates to an imaging apparatus, an imaging method, and so forth for capturing an image.

2. Description of the Related Art

In systems such as driving safety support systems for automobiles, automatic control systems for mobile robots, or surveillance camera systems for detecting a suspicious person or the like, the systems and the users thereof need three-dimensional positional information of the surroundings of the systems in order to made determinations or control the systems.

So-called binocular stereoscopic vision (also referred to as trigonometry) is widely used as a method of acquiring three-dimensional positions (see, for example, Japanese Unexamined Patent Application Publication No. 6-167564). In the binocular stereoscopic vision, two cameras are arranged at mutually different viewpoints in such a manner that their fields of view overlap each other, and these cameras each capture an image. Then, a corresponding point between the two captured images is identified, and the three-dimensional position of the corresponding point is calculated by using the identified corresponding point and information on the two cameras such as their positions and orientations obtained in advance.

The imaging apparatus disclosed in Japanese Unexamined Patent Application Publication No. 6-167564, however, has a problem that its circuit scale is large. In other words, since the imaging apparatus requires the same number of imaging device (i.e., the aforementioned camera) as the number of the viewpoints in order to capture images from mutually different viewpoints, there is a problem that the circuit size is large.

SUMMARY

One non-limiting and exemplary embodiment provides an imaging apparatus and so forth that can reduce the circuit size.

In one general aspect, the techniques disclosed here feature an imaging apparatus, and the imaging apparatus includes an imaging device, two or more imaging optical systems that form respective input images from mutually different viewpoints onto the imaging device, and two or more modulation masks that modulate the input images formed by the respective two or more imaging optical systems. The imaging device captures a superposed image composed of the two or more input images that have been formed by the two or more imaging optical systems, modulated by the two or more modulation masks, and optically superposed on each other, and the two or more modulation masks have mutually different optical transmittance distribution characteristics.

It should be noted that general or specific embodiments may be implemented as a system, a method, an integrated circuit, a computer program, a computer-readable storage medium, or any selective combination thereof. Computer-readable storage media include, for example, a nonvolatile storage medium, such as a Compact Disc-Read Only Memory (CD-ROM).

According to the present disclosure, the circuit size can be reduced. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
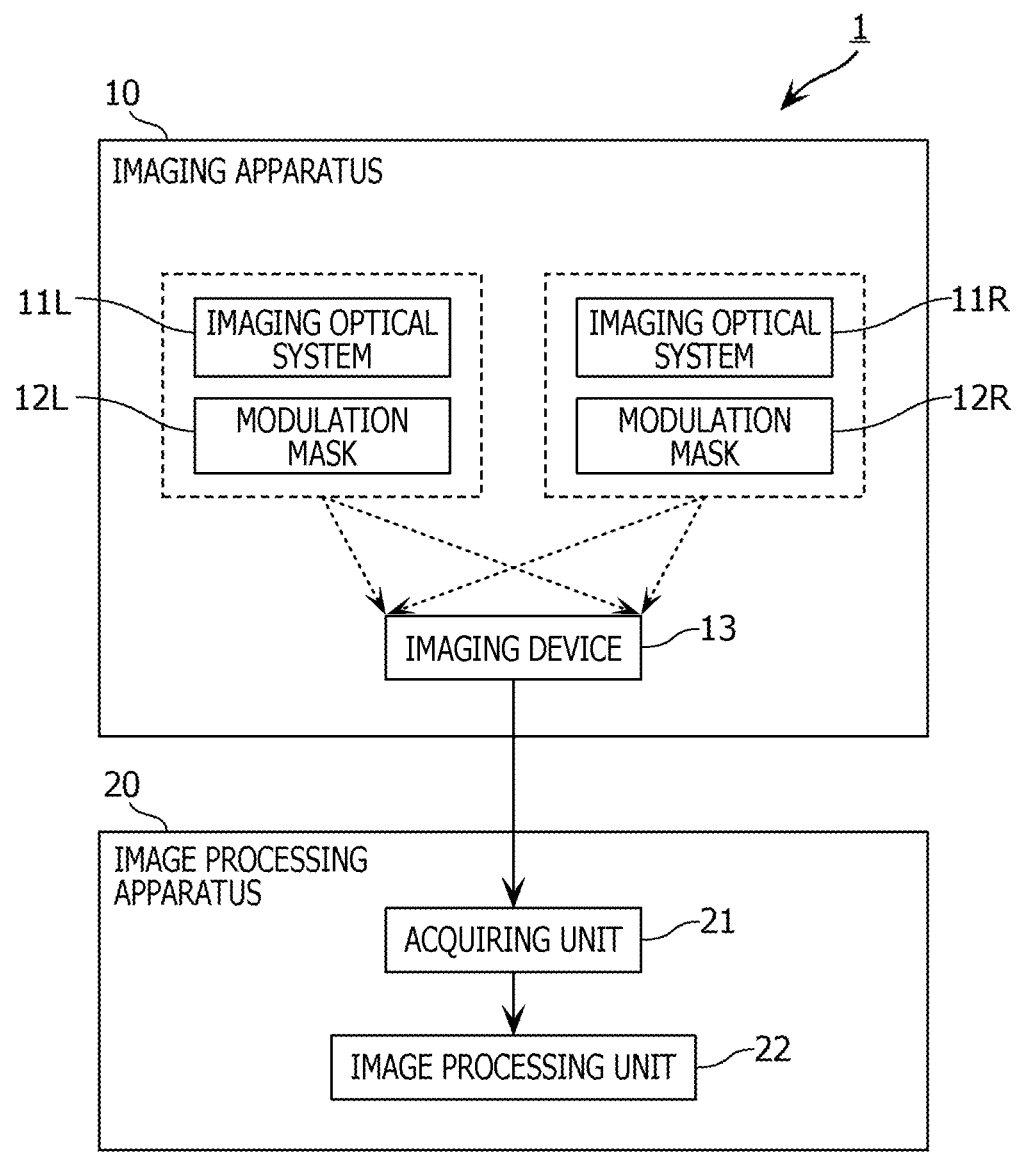
FIG. 1 is a block diagram illustrating a schematic configuration of an imaging system according to a first embodiment.

Underlying Knowledge Forming Basis of the Present Disclosure

The present inventor has found that the following problem arises in the imaging apparatus disclosed in Japanese Unexamined Patent Application Publication No. 6-167564 described in the section titled "Description of the Related Art."

In the binocular stereoscopic vision, the parallax, which is the difference between the directions from two viewpoints, becomes 0 or approaches 0 on or in the vicinity of the straight line connecting the viewpoints of two cameras, which thus leads to a problem in that the three-dimensional position cannot be calculated. In particular, when cameras with a viewing angle of 180 degrees or greater are to be used, an area in which the parallax becomes 0 and the three-dimensional position thus cannot be calculated is inevitably included within the field of view. Thus, the imaging apparatus disclosed in Japanese Unexamined Patent Application Publication No. 6-167564 employs the following method in order to acquire the three-dimensional position in a wider viewing angle. Specifically, three or more cameras are used, and an area in which the three-dimensional position cannot be calculated with two of these cameras is interpolated with the three-dimensional position calculated with other two of these cameras. In addition, Japanese Unexamined Patent Application Publication No. 6-167564 discloses an apparatus that includes cameras having fisheye lenses with a wide viewing angle with the purpose of following an object moving at high speed within the field of view or following a plurality of objects simultaneously. In this technique, fisheye images of a wide viewing angle are acquired with the cameras having the fisheye lenses, a moving object is detected from each of the fisheye images, and a linear equation that passes through the detected moving object is calculated. Then, linear equation sets each composed of a set of a plurality of linear equations pertaining to each moving object are obtained, and thus the three-dimensional position is determined. The use of three or more cameras makes it possible to cover an area in which the three-dimensional position cannot be calculated with given two of these cameras by other cameras, and thus an area in which the three-dimensional position cannot be calculated does not arise.

However, the imaging apparatus disclosed in Japanese Unexamined Patent Application Publication No. 6-167564 has a problem that the circuit size is large, because it requires the same number of imaging device as the number of viewpoints in order to capture images from mutually different viewpoints.

To address such a problem, an imaging apparatus according to an aspect of the present disclosure includes an imaging device, two or more imaging optical systems that form respective input images from mutually different viewpoints onto the imaging device, and two or more modulation masks that modulate the input images formed by the respective two or more imaging optical systems, and the imaging device captures a superposed image composed of the two or more input images that have been formed by the two or more imaging optical systems, modulated by the two or more modulation masks, and optically superposed on each other.

With this configuration, the two or more input images from mutually different viewpoints are optically superposed on each other and captured by the single imaging device, and at this point, these input images have been modulated by the two or more modulation masks. Therefore, by splitting the superposed image composed of the two or more input images that have been modulated and superposed on each other with the use of modulation information that indicates a mode of the modulation masks, reconstructed images corresponding to the original two or more input images can be generated. As a result, the number of imaging devices required in an imaging apparatus in order to capture a plurality of input images from mutually different viewpoints can be reduced to a number smaller than the number of the viewpoints. In other words, a plurality of input images from mutually different viewpoints can be acquired simultaneously with a single imaging device. With this configuration, the circuit size of the imaging apparatus can be reduced.

Here, the two or more modulation masks may have mutually different optical transmittance distribution characteristics. Specifically, the correlation coefficient of the optical transmittance distribution characteristics of the two or more modulation masks may be less than 1. To be more specific, the correlation coefficient of the optical transmittance distribution characteristics of the two or more modulation masks may be substantially 0.

With this configuration, the two or more reconstructed images generated from the superposed image can be made more closer to the original two or more input images that have not been modulated and superposed on each other.

In addition, the optical transmittances at respective sites in each of the two or more modulation masks may be in uniformly random numbers. Alternatively, the optical transmittances at respective sites in each of the two or more modulation masks may be in Gaussian random numbers.

With this configuration, the two or more reconstructed images generated from the superposed image can be made appropriately closer to the original two or more input images that have not been modulated and superposed on each other.

In addition, the imaging apparatus may include a plurality imaging sets each including the two or more imaging optical systems, the two or more modulation masks, and the imaging device.

With this configuration, input images from a larger number of viewpoints can be captured.

An image processing apparatus according to an aspect of the present disclosure includes an acquirer that acquires a superposed image composed of two or more input images from mutually different viewpoints that have been modulated and optically superposed on each other, and an image processor that generates two or more reconstructed images by splitting the superposed image with the use of modulation information that indicates a mode of modulation of the two or more input images.

With this configuration, the reconstructed images corresponding to the original two or more input images can be generated from the superposed image. As a result, the number of imaging devices required in an imaging apparatus in order to capture a plurality of input images from mutually different viewpoints can be reduced to a number smaller than the number of the viewpoints. Thus, the circuit size of the imaging apparatus can be reduced.

In addition, when generating the two or more reconstructed images, the image processor may calculate a parallax between the two or more reconstructed images along with the two or more reconstructed images on the basis of an evaluation value and may calculate the distance to an object in the two or more reconstructed images on the basis of the calculated parallax.

With this configuration, the distance to the object can be calculated, and thus the three-dimensional position around the mutually different viewpoints can be calculated appropriately.

In addition, when generating the two or more reconstructed images, the image processor may calculate a value of a first parameter corresponding to the two or more reconstructed images and a value of a second parameter corresponding to the parallax that minimize the evaluation value that is based on the first parameter and the second parameter, may convert the calculated value of the first parameter to the two or more reconstructed images, and may acquire the calculated value of the second parameter as the parallax. For example, the evaluation value may be a sum of respective values indicated by a first term, a second term, and a third term; the first term may indicate, by using the first parameter, a sum of squares of a difference between the superposed image and images obtained by modulating the two or more reconstructed images in accordance with the modulation information; the second term may indicate a value obtained by weighting an L1-norm of the first parameter; and the third term may indicate, by using the first parameter and the second parameter, a value obtained by weighting an L1-norm of a difference between an image obtained by translating one of the two or more reconstructed images by a distance corresponding to the parallax and another one of the two or more reconstructed images. The first parameter and the second parameter are, for example, c and D, which will be described later, and the evaluation value is a value obtained through a function following argmin in the expression (9), which will be described later.

With this configuration, the two or more reconstructed images and the parallax can be obtained from the evaluation value that is based on the first parameter and the second parameter, and the accuracy of these reconstructed images and the parallax can be increased.

An image processing apparatus according to an aspect of the present disclosure includes an acquirer that acquires a superposed image composed of two or more input images from mutually different viewpoints that have been modulated and optically superposed on each other, and an image processor that calculates a parallax between the two or more input images by using modulation information that indicates a mode of modulation of the two or more input images and the superposed image and calculates the distance to an object in the two or more input images on the basis of the calculated parallax.

With this configuration, the distance to the object can be calculated, and thus the three-dimensional position around the mutually different viewpoints can be calculated appropriately.

It is to be noted that general or specific embodiments of the above may be implemented in the form of a system, a method, an integrated circuit, a computer program, or a computer-readable recording medium such as a CD-ROM, or through any desired combination of a system, a method, an integrated circuit, a computer program, and a recording medium.

Hereinafter, embodiments will be described in concrete terms with reference to the drawings.

It is to be noted that the embodiments described hereinafter merely illustrate general or specific examples. The numerical values, the shapes, the materials, the constituent elements, the arrangement and positions of the constituent elements, the connection modes of the constituent elements, the steps, the order of the steps, and so forth indicated in the embodiments hereinafter are examples and are not intended to limit the present disclosure. In addition, among the constituent elements described in the embodiments hereinafter, a constituent element that is not described in an independent claim indicating the broadest concept is described as an optional constituent element.

Furthermore, the drawings are schematic diagrams and do not necessarily provide the exact depiction. In addition, constituent elements that are identical across the drawings are given identical reference characters.

First Embodiment

1. Schematic Configuration of Imaging System

FIG. 1 illustrates a schematic configuration of an imaging system according to a first embodiment.

As illustrated in FIG. 1, an imaging system 1 according to the first embodiment includes an imaging apparatus 10 and an image processing apparatus 20. The imaging apparatus 10 captures an image in which two images from mutually different viewpoints are superposed on each other, and the image processing apparatus 20 processes the two images that are superposed on each other.

The imaging apparatus 10 includes two imaging optical systems 11L and 11R, two modulation masks 12L and 12R, and an imaging device 13.

The two imaging optical systems 11L and 11R are optical systems including a lens or the like for forming input images from mutually different viewpoints onto the imaging device 13.

The two modulation masks 12L and 12R modulate the input images formed by the two imaging optical systems 11L and 11R, respectively. In each of the modulation masks 12L and 12R, the optical transmittance varies at different sites thereof.

The imaging device 13 captures a superposed image composed of the two input images that have been formed by the two imaging optical systems 11L and 11R, modulated by the two modulation masks 12L and 12R, and optically superposed on each other.

The image processing apparatus 20 includes an acquiring unit 21 and an image processing unit 22.

The acquiring unit 21 acquires the superposed image composed of the two input images from mutually different viewpoints that have been modulated and optically superposed on each other. Here, the superposed image is the image captured by the imaging device 13 of the imaging apparatus 10.

The image processing unit 22 generates reconstructed images corresponding to the two input images by splitting the superposed image with the use of modulation information that indicates a mode of modulation of the two input images. In addition, the image processing unit 22 calculates the parallax between the two reconstructed images by using the modulation information and the superposed image and calculates the distance to an object in the two reconstructed images on the basis of the calculated parallax.

Although the imaging apparatus 10 includes a single imaging set that includes the two imaging optical systems 11L and 11R, the two modulation masks 12L and 12R, and the imaging device 13 in the first embodiment, the imaging apparatus 10 may include a plurality of such imaging sets. In this case, the image processing apparatus 20 acquires a plurality of superposed images captured by the respective imaging sets and generates two reconstructed images for each of the plurality of superposed images by splitting each of the superposed images.

In addition, although the imaging apparatus 10 includes the two imaging optical systems 11L and 11R and the two modulation masks 12L and 12R, the number of the imaging optical systems and the number of the modulation masks are each not limited to two and merely need to be at least two.

When the imaging apparatus 10 includes two or more imaging optical systems and two or more modulation masks, the imaging device 13 captures a superposed image composed of two or more input images that have been formed by the two or more imaging optical systems, modulated by the two or more modulation masks, and optically superposed on each other. In this case, the acquiring unit 21 of the image processing apparatus 20 acquires the superposed image composed of the two or more input images from mutually different viewpoints that have been modulated and optically superposed on each other. The image processing unit 22 generates reconstructed images corresponding to the two or more input images by splitting the superposed image with the use of modulation information that indicates a mode of modulation of the two or more input images. In addition, the image processing unit 22 calculates the parallax between the two or more input images by using the modulation information and the superposed image and calculates the distance to an object in the two or more input images on the basis of the calculated parallax.

2. Detailed Configuration of Imaging System

Hereinafter, the imaging system 1 configured as described above will be described in further detail.

Figure 2:
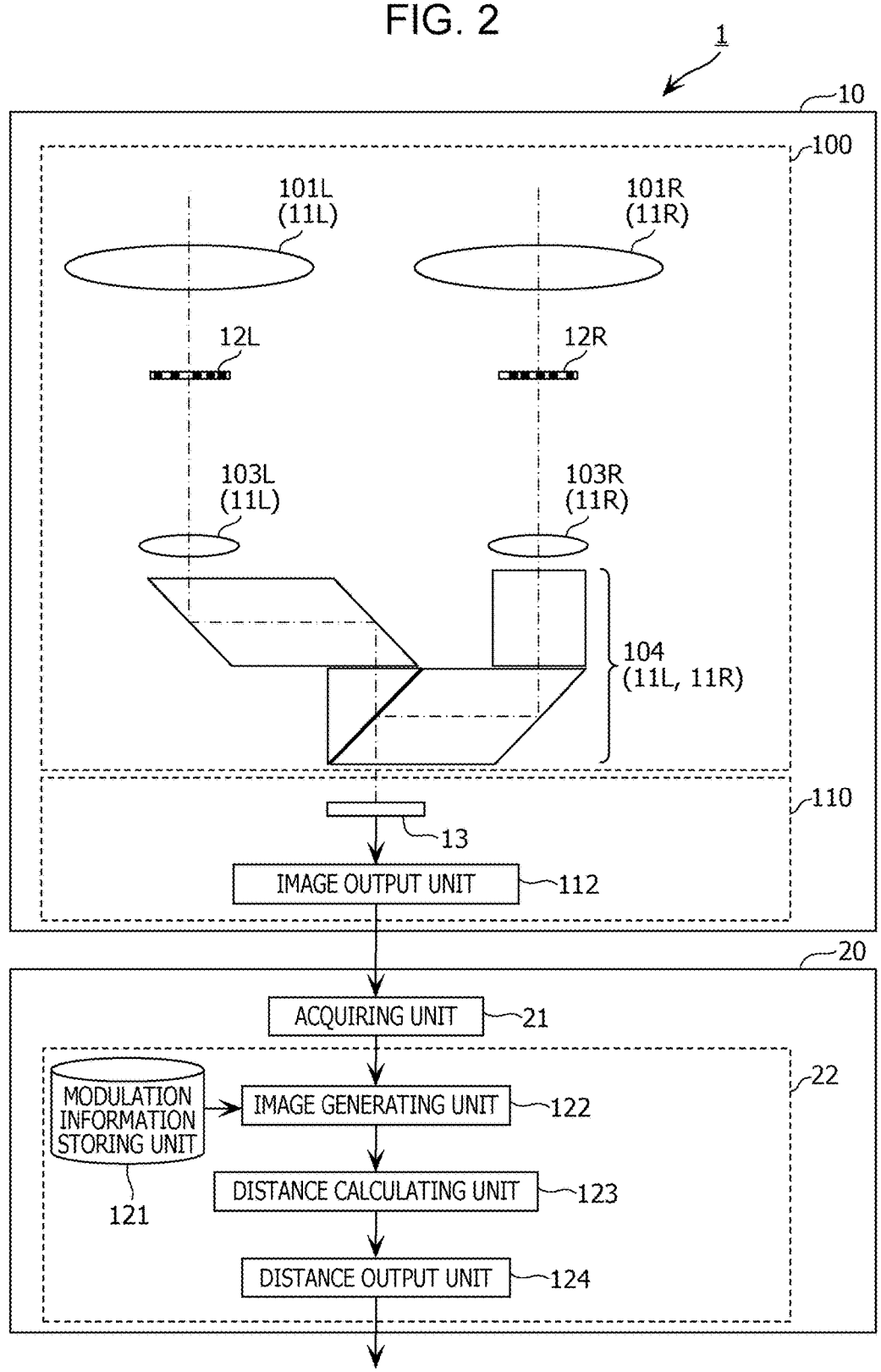
FIG. 2 is a configuration diagram illustrating a specific configuration of the imaging system according to the first embodiment.

FIG. 2 is a configuration diagram illustrating a specific configuration of the imaging system according to the first embodiment.

2-1. Imaging Apparatus

The imaging apparatus 10 includes an optical unit 100 and an imaging unit 110.

The optical unit 100 includes the two imaging optical systems 11L and 11R and the two modulation masks 12L and 12R described above. Here, the imaging optical system 11L includes an optical system 101L constituted by a lens or the like, a relay lens 103L, and a portion of a reflective optical system 104 constituted by a prism or the like (portion on the left side in FIG. 2). The modulation mask 12L is placed between the optical system 101L and the relay lens 103L. For example, the modulation mask 12L is placed on an imaging plane of the optical system 101L. In a similar manner, the imaging optical system 11R includes an optical system 101R constituted by a lens or the like, a relay lens 103R, and a portion of the reflective optical system 104 (portion on the right side in FIG. 2). The modulation mask 12R is placed between the optical system 101R and the relay lens 103R. For example, the modulation mask 12R is placed on an imaging plane of the optical system 101R.

The modulation masks 12L and 12R have mutually different optical transmittance distribution characteristics. In other words, each of the modulation masks 12L and 12R is a mask in which the optical transmittance differs at different positions therein, and the correlation coefficient of the optical transmittance distribution characteristics of the modulation masks 12L and 12R is less than 1. For example, the correlation coefficient of the optical transmittance distribution characteristics of the modulation masks 12L and 12R is substantially 0. In other words, the modulation masks 12L and 12R are uncorrelated. In addition, the optical transmittances at respective sites in each of the modulation masks 12L and 12R are in uniformly random numbers. However, the present disclosure is not limited to the uniformly random numbers, and the optical transmittances may be in Gaussian random numbers.

The imaging unit 110 includes the imaging device 13 described above and an image output unit 112.

The imaging device 13 is a device that converts a two-dimensional distribution of optical intensities to electronic image data and captures a superposed image composed of two input images that have been formed, modulated, and optically superposed on each other, as described above. The image output unit 112 outputs the superposed image captured by the imaging device 13 to the image processing apparatus 20.

Although the modulation masks 12L and 12R are placed on the imaging planes of the optical systems 101L and 101R, respectively, in the example illustrated in FIG. 2, the modulation masks 12L and 12R may instead be placed at pupil positions of the optical systems 101L and 101R, respectively.

Figure 3:
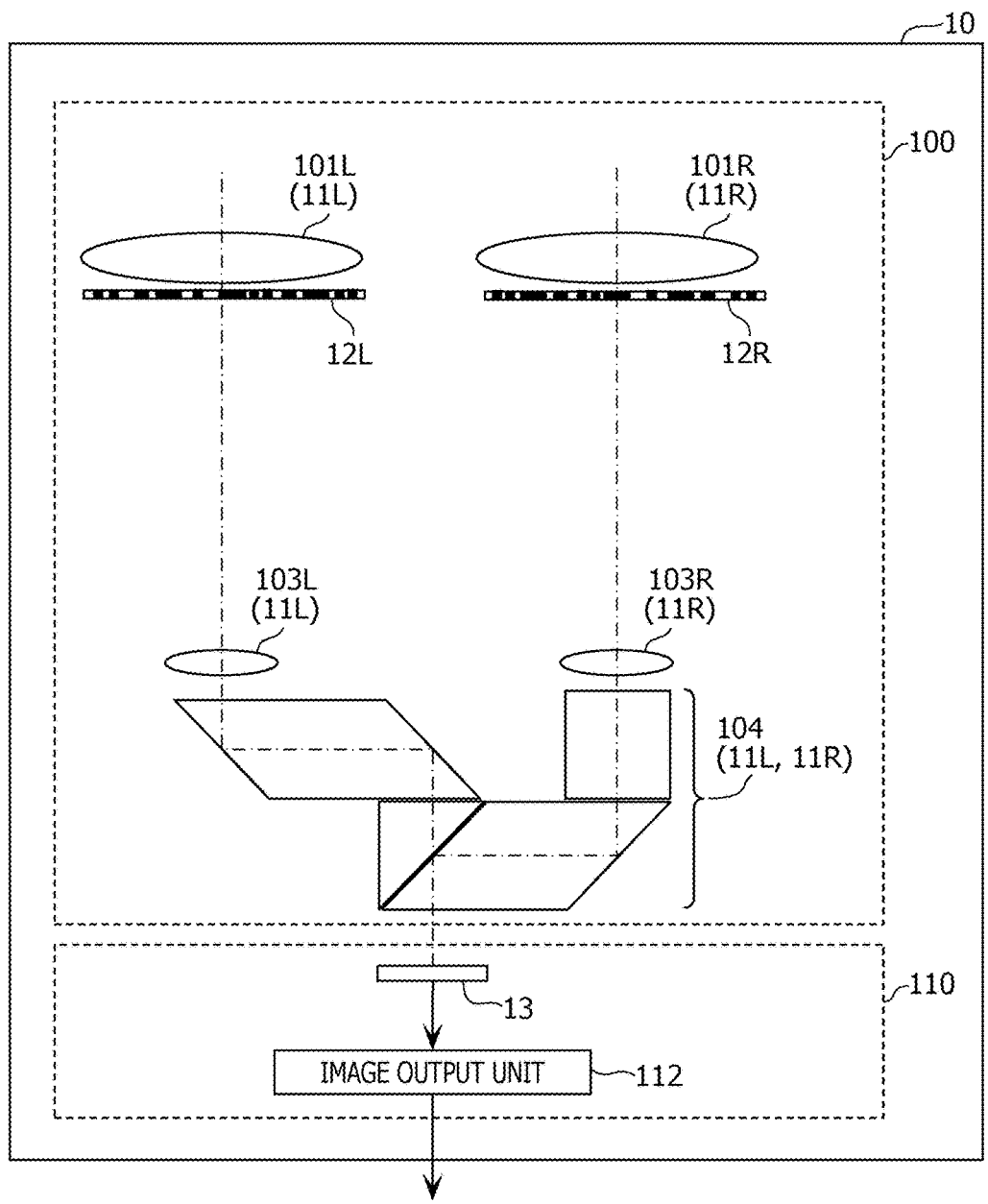
FIG. 3 is a schematic diagram illustrating another exemplary configuration of an optical unit according to the first embodiment.

FIG. 3 illustrates another example of the configuration of the optical unit 100.

As illustrated in FIG. 3, the modulation masks 12L and 12R are placed as pupil positions of the optical systems 101L and 101R, respectively. It is to be noted that the modulation masks 12L and 12R may instead be placed at positions other than the positions of the imaging planes or the pupils.

2-2. Image Processing Apparatus

The image processing apparatus 20 includes the acquiring unit 21 and the image processing unit 22 described above.

The image processing unit 22 includes a modulation information storing unit 121, an image generating unit 122, a distance calculating unit 123, and a distance output unit 124.

The modulation information storing unit 121 stores information that indicates a mode of modulation by each of the modulation masks 12L and 12R, or in other words, stores modulation information, which is the information pertaining to the transmittances of these masks.

The image generating unit 122 generates reconstructed images corresponding to the two input images from mutually different viewpoints by splitting the superposed image acquired by the acquiring unit 21 with the use of the modulation information stored in the modulation information storing unit 121.

The distance calculating unit 123 calculates the parallax between the two reconstructed images generated through the aforementioned split and calculates the distance to an object in the reconstructed images on the basis of the calculated parallax.

The distance output unit 124 outputs, as distance information, the information that indicates the distance calculated by the distance calculating unit 123.

3. Processing Operation

With the configuration described above, in the imaging apparatus 10, an input image $I_1$ and an input image $I_2$ obtained by the optical systems 101L and 101R, respectively, are coded by the modulation mask 12L and the modulation mask 12R that differ mutually, or in other words, are subjected to luminance modulation. The imaging device 13 captures an image in which the input image $I_1$ subjected to first luminance modulation by the modulation mask 12L and the input image $I_2$ subjected to second luminance modulation by the modulation mask 12R are optically superposed on and added to each other as an observation image y, which is the superposed image described above. The image output unit 112 reads out the observation image y from the imaging device 13 and outputs the observation image y.

3-1. Input Images and Observation Image

Now, the relationship between input images and an observation image will be described in each of the case in which the modulation masks 12L and 12R are placed on the imaging planes (the case of the arrangement illustrated in FIG. 2) and the case in which the modulation masks 12L and 12R are placed at the pupil positions (the case of the arrangement illustrated in FIG. 3).

When Modulation Masks 12L and 12R Are Placed on Imaging Plane

When the modulation masks 12L and 12R are placed on the imaging planes, the coding indicated in the following expression (1) is carried out in the imaging apparatus 10, in which the luminance values of the input images $I_1$ and $I_2$ are integrated with the transmittances of the modulation masks 12L and 12R, respectively, and the results are then added together.

$$y = A_1 I_1 + A_2 I_2 \quad (1)$$

In the expression (1), y is the observation image. $I_1$ and $I_2$ are the luminance values of the respective input images and are each a vector with the number of elements N when the number of the pixels in the input image is N. $A_1$ is the optical transmittance of the modulation mask 12L and is a square matrix of N by N having, as a diagonal component, the transmittance at each site of the modulation mask 12L corresponding to each pixel position of the input image $I_1$. In a similar manner, $A_2$ is the optical transmittance of the modulation mask 12R and is a square matrix of N by N having, as a diagonal component, the transmittance at each site of the modulation mask 12R corresponding to each pixel position of the input image $I_2$.

When Modulation Masks 12L and 12R Are Placed at Pupil Positions

When the modulation masks 12L and 12R are placed at the pupil positions, the imaging device 13 captures an observation image y as indicated in the following expression (2). This observation image y is an image in which an image obtained by subjecting the input image $I_1$ to modulation determined by a first random pattern and an image obtained by subjecting the input image $I_2$ to modulation determined by a second random pattern are added to each other.

$$y = A'_1 I_1 + A'_2 I_2 \quad (2)$$

The modulations $A'_1$ and $A'_2$ in the expression (2) will be described, hereinafter.

Figure 4:
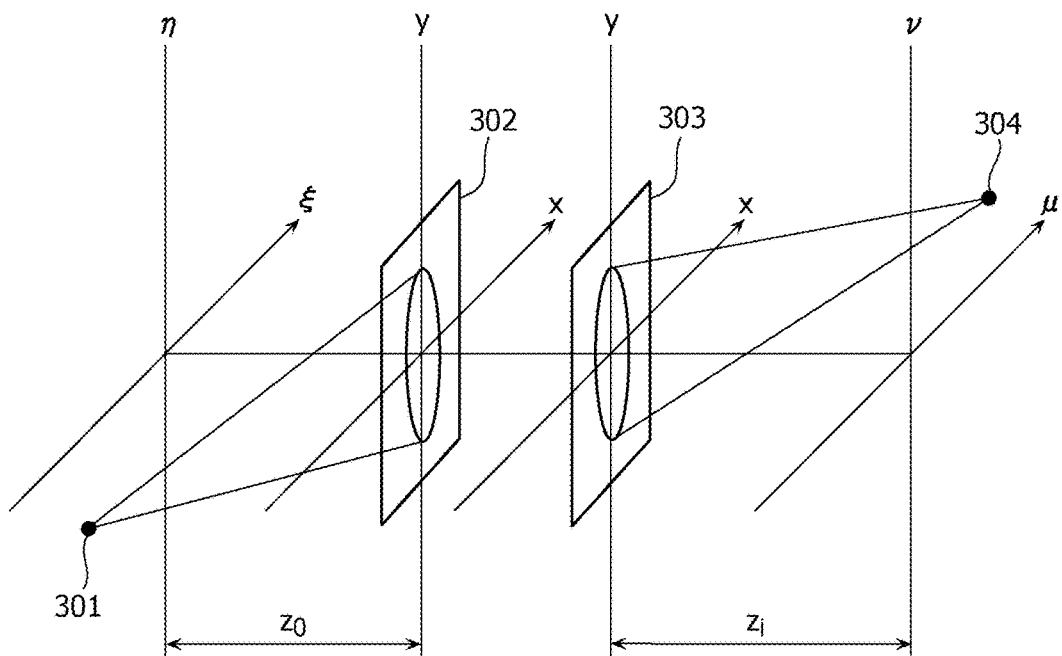
FIG. 4 illustrates an ideal optical system.

FIG. 4 illustrates an ideal optical system. As illustrated in FIG. 4, in the ideal optical system, a divergent spherical wave emitted from a point light source 301 on an object plane ζη enters an entrance pupil 302 and then exits through an exit pupil 303 as a convergent spherical wave, which forms an image 304 on an imaging plane μv. Here, the distance between the object plane ζη and the entrance pupil 302 is the distance $z_o$, and the distance between the exit pupil 303 and the imaging plane μv is the distance $z_i$.

In reality, the image 304 is not imaged at one point on the imaging plane μv due to an influence of diffraction by the pupils and results in an image with a spread. This spread is referred to as a point spread function and is represented by a Fraunhofer diffraction image of the pupil function indicated in the following expression (3).

$$h(u, v) = \frac{C a}{\lambda z_i} \int \int_{-\infty}^{\infty} P(x, y) \exp\left(-j \frac{2\pi}{\lambda z_i}(ux + vy)\right) dx dy \quad (3)$$

In the expression (3), Ca is a constant, and λ is the wavelength of light. P(x,y) is the pupil function and matches the spatial distribution of the transmittances of the modulation masks 12L and 12R when the modulation masks 12L and 12R are placed at the pupil positions.

It is to be noted that the diagonal components of the transmittances $A_1$ and $A_2$ of the modulation masks 12L and 12R, respectively, in the expression (1) take the values obtained by integrating the spatial distribution P(x,y) of the above transmittances by an area corresponding to each pixel of the input image.

The optical transfer function (OTF) of an incoherent imaging system is defined as in the following expression (4) through the point spread function.

$$OTF(f_x, f_y) = \frac{\int \int_{-\infty}^{\infty} |h(u, v)|^2 \exp(-j2\pi(f_x u, f_y v)) du dv}{\int \int_{-\infty}^{\infty} |h(u, v)|^2 du dv} \quad (4)$$

Obtained by discretizing the OTF of each of the spatial patterns of the modulation masks 12L and 12R and by expressing the results in matrices are $Q_1$ and $Q_2$, and a Fourier transform matrix and an inverse Fourier transform matrix are F and $F^{-1}$, respectively. In this case, the OTF expresses the optical transfer in the frequency domain, and thus the sampling in the real space of the above expression (2) is expressed by the following expression (5).

$$y = F_1^{-1} Q_1 F I_1 + F_2^{-1} Q_2 F I_2 \quad (5)$$

On the basis of the expression (2) and the expression (5) above, the modulations $A'_1$ and $A'_2$ can be expressed as in the following expression (6).

$$A'_1 = F_1^{-1} Q_1 F \quad A'_2 = F_2^{-1} Q_2 F \quad (6)$$

When the modulation masks 12L and 12R are located at positions between the imaging planes and the pupils, the modulations of the input images $I_1$ and $I_2$ are the modulations in which the diffraction effect by the exit pupils (circular pupil in the case illustrated in FIG. 4) and the diffraction effect by the modulation masks 12L and 12R are combined together.

On the basis of the above, regardless of the positions of the modulation masks 12L and 12R, in either case of the expression (1) and the expression (2) above, the observation image y is expressed as in the following expression (7) as a linear transformation of an input image $(I_1^T I_2^T)^T$.

$$y = (A_1 \quad A_2) \begin{pmatrix} I_1 \\ I_2 \end{pmatrix} \quad (7)$$

In the expression (7) above, A is an observation matrix, and the observation matrix A can be obtained in advance from the arrangement and the transmittance distribution characteristics of the modulation masks 12L and 12R in the optical unit 100. This observation matrix A is an example of the modulation information described above.

3-2. Image Generation and Distance Calculation

The modulation information storing unit 121 stores the modulation information A, which is the information on the modulation masks 12L and 12R obtained in advance. The image generating unit 122 obtains reconstructed images $I_1'$ and $I_2'$ corresponding to the input images $I_1$ and $I_2$ of the above expression (7) by using the modulation information A and the observation image y captured by the imaging unit 110. In other words, the image generating unit 122 generates the two reconstructed images $I_1'$ and $I_2'$ by splitting the observation image y.

$$y = (A_1 \quad A_2) \begin{pmatrix} I_1' \\ I_2' \end{pmatrix} \quad (7')$$

Hereinafter, the method by which the image generating unit 122 obtains the reconstructed images $I_1'$ and $I_2'$ from the modulation information A and the observation image y will be described. In the expression 7', the number of variables in the reconstructed images $I_1'$ and $I_2'$ is 2N, whereas the number of expressions is N, which is smaller than the number of variables. Thus, the solution is not determined uniquely with the expression (7') alone. Therefore, the reconstructed images $I_1'$ and $I_2'$ are obtained from the modulation information A and the observation image y through the expression (8) in which the sparsity is added as a constraint condition. The sparsity is a property in which the reconstructed images $I_1'$ and $I_2'$ become sparse in a specific space such as a frequency space. In other words, the sparsity is a property in which, when $I_1'$ and $I_2'$ are converted to the frequency space, a tiny portion of the coefficients becomes non-zero and the remaining coefficients become zero or small enough values that can be regarded as zero. The problem of obtaining the reconstructed images $I_1'$ and $I_2'$ in the expression (8) can be solved through the convex optimization. Specifically, the image generating unit 122 obtains c from the following expression (8) through a known convex optimization algorithm. The image generating unit 122 then obtains the solution $(I_1^T, I_2^T)^T = W^{-1}c$ from the obtained c. W is an operator that converts the solution to a specific space and, for example, is a discrete cosine transform (DCT).

$$\underset{c}{\operatorname{argmin}}\left(\|y - (A_1 \ A_2)W^{-1}c\|_2^2 + \lambda\|c\|_1\right) \quad (8)$$

$$\begin{pmatrix} I_1' \\ I_2' \end{pmatrix} = W^{-1}c$$

In the expression (8), $\lambda$ is a weighting factor. Although the operator W in the expression (8) is, for example, a DCT, the operator W is not limited to a DCT and may be any of a variety of transforms such as a curvelet transform or a wavelet transform or a combination thereof. The constraint condition in the expression (8) is not limited to the L1-norm indicated above, and an L0-norm, an L2-norm, an L∞-norm, or an Lp-norm in which p has a decimal number may instead be used. In addition, a regularization term aside from these norms may be used as the constraint condition, or a plurality of combinations of these norms and the regularization term may also be used.

Through the processing described above, the image generating unit 122 generates the reconstructed images $I_1'$ and $I_2'$ corresponding to the input images $I_1$ and $I_2$ in the expression (7).

The distance calculating unit 123 acquires the reconstructed image $I_1'$ and the reconstructed image $I_2'$ generated by the image generating unit 122 and calculates the distance from the imaging apparatus 10 to the object in each of the reconstructed image $I_1'$ and the reconstructed image $I_2'$ through the distance calculation method based on the binocular stereoscopic vision. In other words, the distance calculating unit 123 calculates the three-dimensional position including the distance. The distance output unit 124 outputs the three-dimensional position calculated by the distance calculating unit 123.

4. Simulation Result

Figure 5:
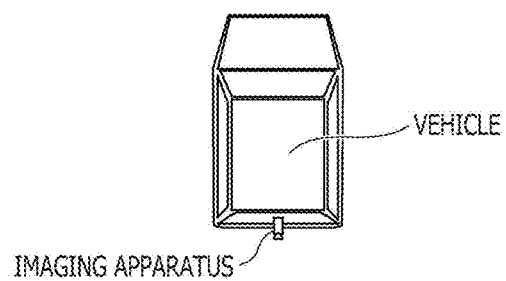
FIG. 5 illustrates an exemplary arrangement of an imaging apparatus and an exemplary imaging condition according to the first embodiment.
Figure 5:
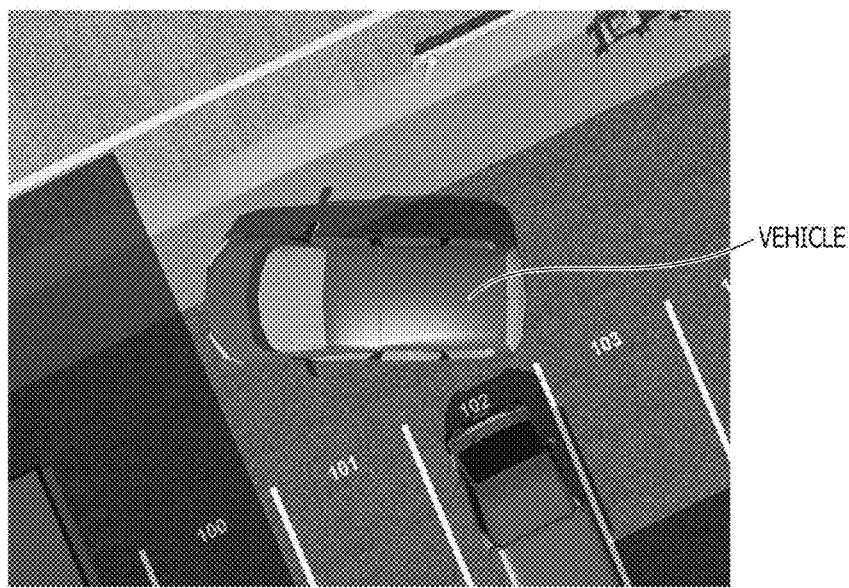
Figure 6:
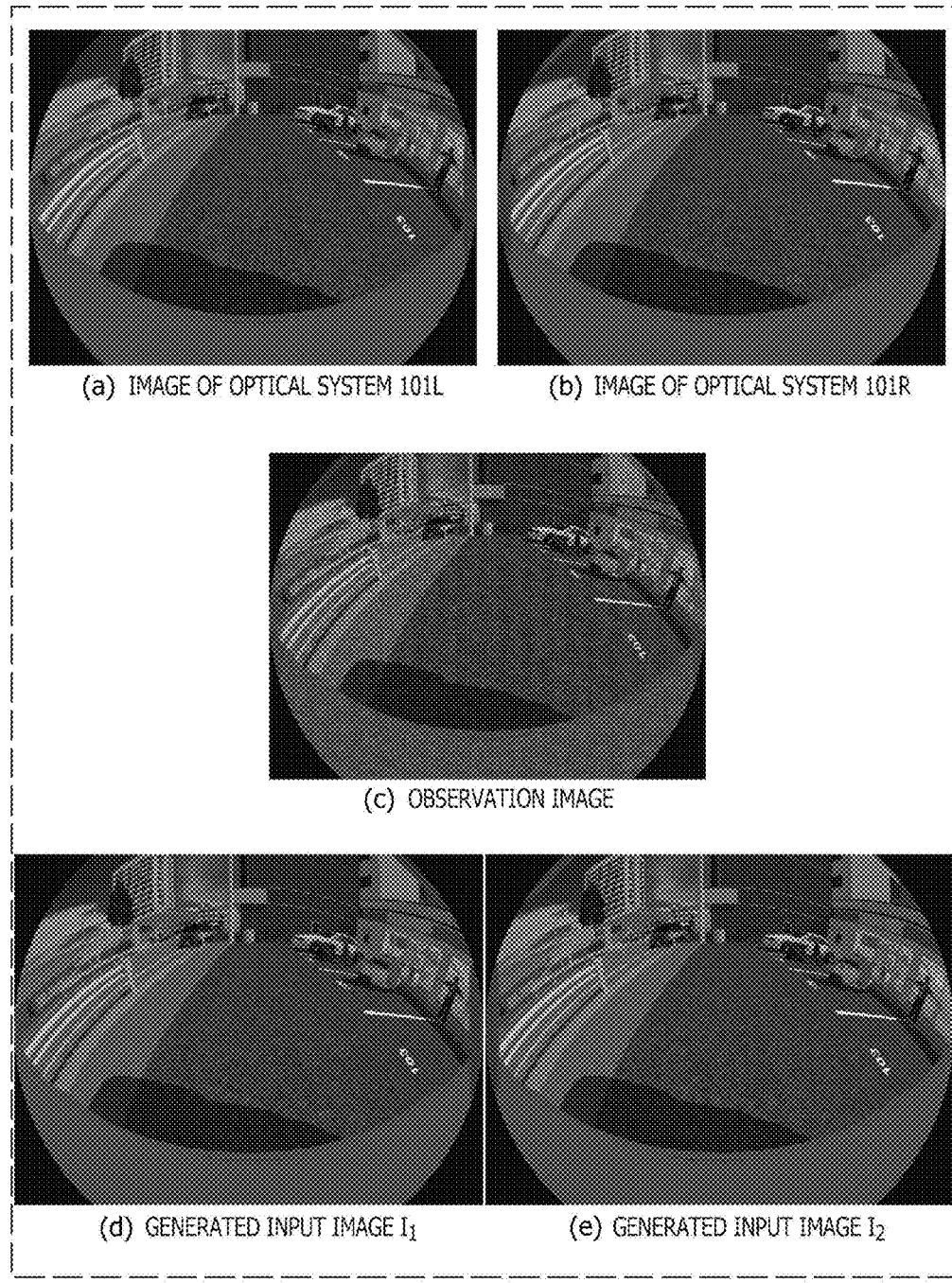
FIG. 6 illustrates input images of computer graphics, an observation image based on the input images, and reconstructed images generated from the observation image according to the first embodiment.
Figure 7:
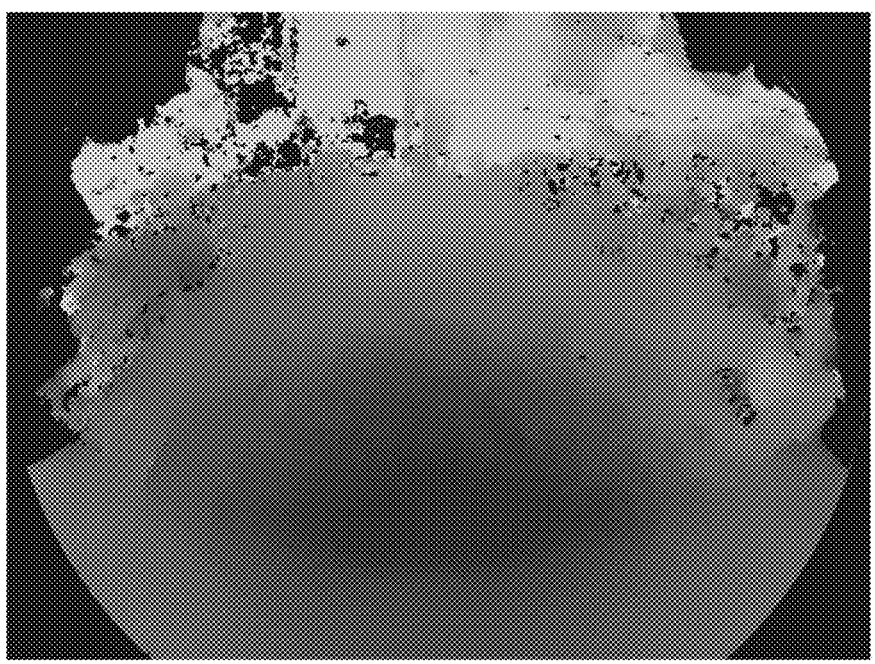
FIG. 7 illustrates the distance calculated by a distance calculating unit according to the first embodiment and the true value of the distance for comparison.
Figure 7:
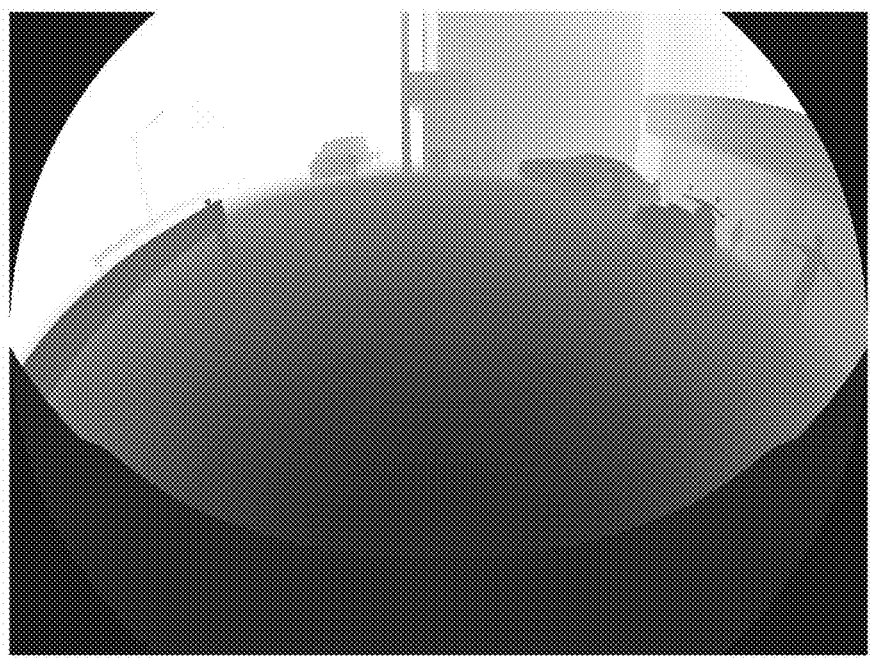

FIGS. 5 through 7 illustrate examples of a simulation result according to the first embodiment. Specifically, FIGS. 5 through 7 illustrate examples of a simulation result of processing in which two input images from different viewpoints obtained by the optical unit 100 of the imaging system 1 are modulated and superposed on each other and the distance is calculated from the superposed image obtained through such superposition.

FIG. 5 illustrates an exemplary arrangement and an exemplary imaging condition of the imaging apparatus 10. As illustrated in (a) of FIG. 5, the imaging apparatus 10 is installed on the rear side of a vehicle. Then, as illustrated in (b) of FIG. 5, the imaging apparatus 10 captures an image while the vehicle parks in a parking lot.

FIG. 6 illustrates input images of computer graphics, an observation image based on these input images, and reconstructed images generated from the observation image.

Specifically, the images illustrated in (a) and (b) of FIG. 6 are input images generated through computer graphics from images obtained by the two optical systems 101L and 101R in the imaging condition illustrated in (b) of FIG. 5. The image illustrated in (c) of FIG. 6 is an example of an image obtained by modulating the two images illustrated in (a) and (b) of FIG. 6 by the modulation masks 12L and 12R placed as illustrated in FIG. 2 and superposing the modulated images on each other, or in other words, is an example of an observation image. In this example, multi-valued uniformly random numbers are used as the optical transmittances at respective sites in each of the modulation masks 12R and 12L. The images illustrates in (d) and (e) of FIG. 6 are examples of the reconstructed images $I_1'$ and $I_2'$ generated by the image generating unit 122 with the use of the expression (8). This simulation result reveals that the observation image can be split into the two reconstructed images of the respective viewpoints.

FIG. 7 illustrates the distance calculated by the distance calculating unit 123 and the true value of the distance for comparison. The gradation in the images illustrated in (a) and (b) of FIG. 7 represents the distance from the imaging apparatus 10. As illustrated in (a) of FIG. 7, the distance calculating unit 123 calculates the distance from the imaging apparatus 10 to the object in each of the reconstructed images $I_1'$ and $I_2'$ on the basis of the generated two reconstructed images $I_1'$ and $I_2'$. The distance calculated by the distance calculating unit 123 is close to the true value illustrated in (b) of FIG. 7. Accordingly, the imaging system 1 according to the present embodiment can appropriately calculate the distance to the object.

5. Advantageous Effects

With the configuration described thus far, in the first embodiment, two input images from mutually different viewpoints are superposed on each other on the single imaging device 13, the superposed image obtained by the imaging of the imaging device 13 is split, and thus reconstructed images corresponding to the original two input images can be generated. In other words, in order to obtain two input images, a conventional imaging apparatus requires imaging devices corresponding to two cameras, but the imaging apparatus 10 according to the first embodiment requires only the imaging device 13 corresponding to a single camera. Accordingly, the circuit size of the imaging unit 110 can be kept small, and the cost can also be reduced advantageously.

In addition, in a conventional technique, data transmitted from an imaging apparatus to an image processing apparatus that calculates the distance needs to be in the amount corresponding to images in a number equal to the number of viewpoints, for example, two images. In contrast, in the first embodiment, the amount of data of a superposed image (or observation image) transmitted from the imaging apparatus 10 to the image processing apparatus 20 can be reduced to the amount corresponding to a single image. In other words, the data transmission amount can be reduced.

In the first embodiment, the optical unit 100 includes the two imaging optical systems 11L and 11R, and the image generating unit 122 generates two reconstructed images. The number of the imaging optical systems included in the optical unit 100, however, is not limited to two and may be three or more. In this case, the input images in the expression (7) are replaced with a matrix constituted by arranging input images $I_1, I_2, I_3, \ldots$ in a number equal to the number of the imaging optical systems. With this configuration, the reconstructed images can be generated in a number equal to the number of the imaging optical systems, or in other words, equal to the number of the viewpoints, and the distance can be calculated accordingly with the operation identical to that of the first embodiment.

Modification of First Embodiment

In the first embodiment described above, a plurality of input images are superposed on each other on the single imaging device 13, and thus the imaging optical systems 11L and 11R of the optical unit 100 include the relay lenses 103L and 103R and the reflective optical system 104 constituted by a prism or the like, as illustrated in FIGS. 2 and 3. In contrast, constituent elements included in the imaging optical systems 11L and 11R of the optical unit 100 according to the present disclosure are not limited to the relay lenses 103L and 103R and the reflective optical system 104. Imaging optical systems 11L and 11R of an imaging apparatus 10 according to the present modification have configurations different from those illustrated in FIGS. 2 and 3.

Figure 8:
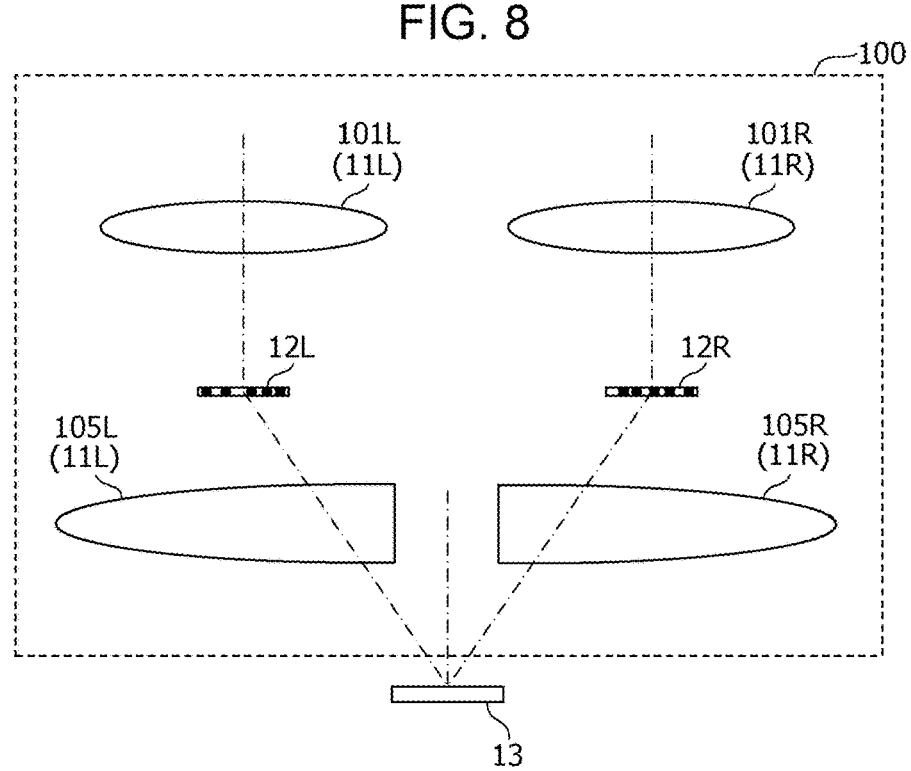
FIG. 8 illustrates a configuration of two imaging optical systems in an optical unit according to a modification of the first embodiment.

FIG. 8 illustrates a configuration of the imaging optical systems 11L and 11R of the optical unit 100 according to the present modification.

For example, as illustrated in FIG. 8, the imaging optical systems 11L and 11R of the optical unit 100 according to the present modification include decentered optical systems 105L and 105R, in place of the relay lenses 103L and 103R and the reflective optical system 104. With such a configuration as well, the imaging optical system 11L forms an input image modulated by the modulation mask 12L corresponding to the imaging optical system 11L onto the imaging device 13. In a similar manner, the imaging optical system 11R forms an input image modulated by the modulation mask 12R corresponding to the imaging optical system 11R onto the imaging device 13.

Figure 9:
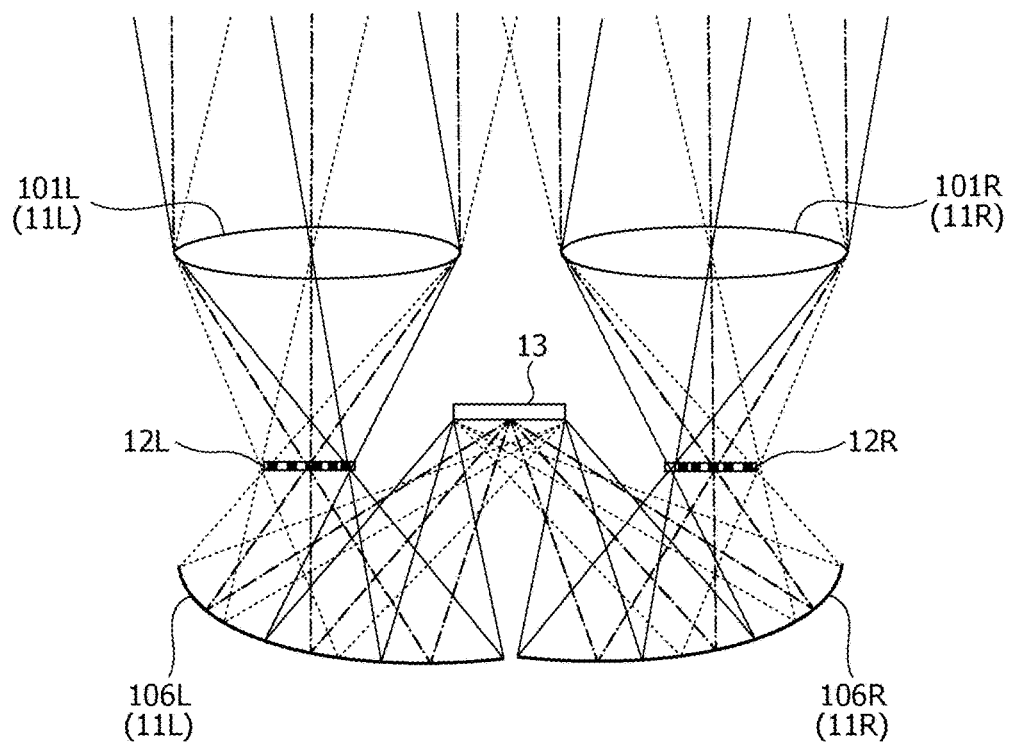
FIG. 9 illustrates another configuration of the two imaging optical systems in the optical unit according to the modification of the first embodiment.

FIG. 9 illustrates another configuration of the imaging optical systems 11L and 11R of the optical unit 100 according to the present modification.

For example, as illustrated in FIG. 9, the imaging optical systems 11L and 11R of the optical unit 100 according to the present modification include freeform mirror optical systems 106L and 106R, in place of the relay lenses 103L and 103R and the reflective optical system 104. With such a configuration as well, the imaging optical system 11L forms an input image modulated by the modulation mask 12L corresponding to the imaging optical system 11L onto the imaging device 13. In a similar manner, the imaging optical system 11R forms an input image modulated by the modulation mask 12R corresponding to the imaging optical system 11R onto the imaging device 13.

In other words, in either of the configurations illustrated in FIGS. 8 and 9, an image obtained by modulating input images from the respective viewpoints of the optical systems 101L and 101R with the modulation masks 12L and 12R and by then superposing the modulated input images on each other can be captured by the imaging device 13 as a superposed image or an observation image.

Accordingly, as in the first embodiment described above, the image generating unit 122 can generate the input images $I_1$ and $I_2$ obtained by the optical systems 101L and 101R, respectively. Furthermore, the distance calculating unit 123 can calculate the distance to the object in the input images $I_1$ and $I_2$.

When the reflective optical system 104 is used, as in the first embodiment described above, attenuation of light in the prism is relatively large. In the present modification, however, the decentered optical systems 105L and 105R or the freeform mirror optical systems 106L and 106R are used, and thus attenuation of light in the optical systems can advantageously be kept sufficiently small. In other words, an image that is bright and with less noise can advantageously be obtained by the imaging device 13.

Second Embodiment

In the first embodiment, reconstructed images corresponding to input images from two viewpoints are generated from a superposed image obtained by superposing input images from two viewpoints on each other, and the distance is then calculated on the basis of the binocular stereoscopic vision. In contrast, in a second embodiment, from a superposed image obtained by modulating input images from two viewpoints and superposing the modulated input images on each other, reconstructed images corresponding to the input images from the two viewpoints are generated and, at the same time, the parallax between these two reconstructed images is estimated. With this configuration, the accuracy in calculating the distance to the object can be improved.

Hereinafter, the second embodiment will be described in detail.

An imaging system 1 according to the second embodiment has the same configuration as that of the first embodiment. In other words, the imaging system 1 has the configurations illustrated in FIGS. 1 through 3. The imaging system 1 according to the second embodiment differs, however, from the imaging system 1 according to the first embodiment in terms of the operation of the image generating unit 122 and the distance calculating unit 123. Specifically, in the second embodiment, the image generating unit 122 generates two reconstructed images $I_1'$ and $I_2'$ from an image captured by the imaging apparatus 10, or in other words, from a superposed image obtained by superposing input images from two viewpoints on each other. At this point, the image generating unit 122 also calculates the parallax between the two reconstructed images $I_1'$ and $I_2'$ concurrently. Then, the distance calculating unit 123 calculates the distance to the object on the basis of the parallax between the two reconstructed images $I_1'$ and $I_2'$ calculated by the image generating unit 122 and parameters of the two optical systems 101L and 101R. The parameters of the two optical systems 101L and 101R are parameters necessary for binocular stereoscopic vision and include, for example, the distance between the optical systems 101L and 101R.

1. Image Generating Unit

Hereinafter, the operation of the image generating unit 122 according to the second embodiment will be described in detail.

The image generating unit 122 acquires an observation image y from the image output unit 112 via the acquiring unit 21. The image generating unit 122 then obtains reconstructed images $I_1'$ and $I_2'$ from the observation image y. The reconstructed images $I_1'$ and $I_2'$ correspond to input images $I_1$ and $I_2$ obtained by the optical systems 101L and 101R, respectively. When obtaining the reconstructed images $I_1'$ and $I_2'$, the image generating unit 122 uses the evaluation formula indicated in the expression (8) in the first embodiment. In the second embodiment, however, the image generating unit 122 uses a different evaluation formula and thus estimates the reconstructed images $I_1'$ and $I_2'$ and the parallax between the reconstructed images $I_1'$ and $I_2'$ at the same time. Specifically, the image generating unit 122 uses the following expression (9) as the aforementioned different evaluation formula. In other words, the image generating unit 122 obtains c and D that satisfy the expression (9) through a convex optimization algorithm and obtains the reconstructed image $(I_1^T, I_2^T)^T = W^{-1}c$ from c.

$$\operatorname*{argmin}_{c,D}\left(\|y - (A_1 \; A_2)W^{-1}c\|_2^2 + \lambda_1\|c\|_1 + \lambda_2\|Ms(-DI)W^{-1}c\|_1\right) \quad (9)$$

$$\begin{pmatrix} I_1' \\ I_2' \end{pmatrix} = W^{-1}c$$

In the expression (9) above, $\lambda_1$ and $\lambda_2$ are weighting factors, and Ms and D are as follows.

$$Ms = \begin{bmatrix} 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 0 \\ 0 & 0 & 0 & 0 & 0 & 0 & 0 & 0 \end{bmatrix} \quad (10)$$

$$D = \begin{bmatrix} 0 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}, \begin{bmatrix} 0 & 0 & 0 & 0 & 0 & 0 & 0 & 0 \\ 0 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 0 & 0 & 0 \\ 0 & 0 & 0 & 0 & 0 & 0 & 0 & 0 \end{bmatrix},$$

$$\ldots, \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \end{bmatrix}$$

The third term in the expression (9) is a parallax constraint term and is a constraint that the translated reconstructed image $I_1'$ matches the reconstructed image $I_2'$ with respect to the generated two reconstructed images $I_1'$ and $I_2'$. Ms is a mask matrix for extracting a partial region of an image and is a square matrix of N by N. The parallax D is a parallax matrix for translating the reconstructed image $I_1'$ by a predetermined parallax and is a square matrix of N by N. I is a unit matrix of N by N.

In the expression (9), when it can be assumed that the parallax within a small region of O pixels in an image of N pixels (N>O) is the same, O diagonal elements of N diagonal elements in the mask matrix Ms are 1, and the other diagonal elements are 0. For example, the mask matrix Ms of the expression (9) is a matrix in a case in which it is assumed that the parallax within a small region constituted by four neighboring pixels is the same and includes four diagonal elements having a value of 1. Then, the image generating unit 122 repeats the processing of calculating c and D that satisfy the expression (9) for each small region of O pixels and thus calculates all the pixels of the reconstructed images $I_1'$ and $I_2'$ and the parallax D. It is to be noted that the diagonal elements described above are also referred to as diagonal components.

In this manner, in the second embodiment, when generating two reconstructed images, the image generating unit 122 calculates the two reconstructed images as well as the parallax between the two reconstructed images on the basis of an evaluation value. The evaluation value, for example, is the value indicated by the function following argmin in the expression (9) above. Specifically, when generating the two reconstructed images, the image generating unit 122 calculates the value of a first parameter corresponding to the two reconstructed images and the value of a second parameter corresponding to the parallax between the two reconstructed images that minimize the evaluation value that is based on the first parameter and the second parameter. Then, the image generating unit 122 converts the calculated value of the first parameter to the two reconstructed images and acquires the calculated value of the second parameter as the parallax. The first parameter, for example, is c in the expression (9) above, and the second parameter, for example, is D in the expression (9) above.

To be more specific, the evaluation value is a sum of the values indicated by a first term, a second term, and a third term. The first term indicates, by using the first parameter, the sum of squares of a difference between the superposed image and the images obtained by modulating the two reconstructed images with the use of the modulation information. The second term indicates a value obtained by weighting an L1-norm of the first parameter. The third term indicates, by using the first parameter and the second parameter, a value obtained by weighting an L1-norm of a difference between an image obtained by translating one of the two reconstructed images by a distance corresponding to the parallax and the other one of the two reconstructed images.

With this configuration, in the second embodiment, from a superposed image obtained by superposing input images from two viewpoints, reconstructed images corresponding to the input images from the two viewpoints and the parallax between these two reconstructed images can be calculated at the same time. Furthermore, the accuracy in calculating the parallax can be improved.

2. Distance Calculating Unit

The distance calculating unit 123 calculates the three-dimensional position including the distance to the object in the reconstructed images $I_1'$ and $I_2'$ from the parallax D calculated by the image generating unit 122.

3. Simulation Result

Figure 10:
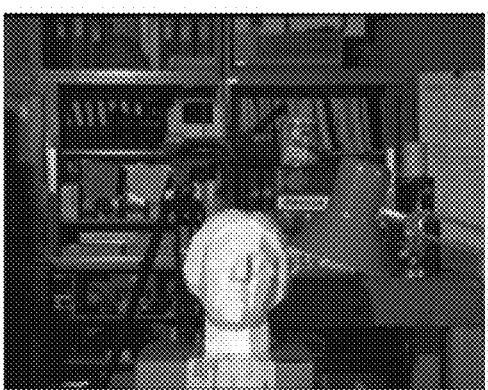
FIG. 10 illustrates an example of a simulation result according to a second embodiment.
Figure 10:
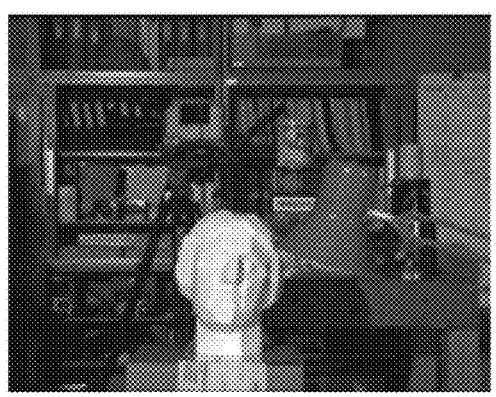
Figure 10:
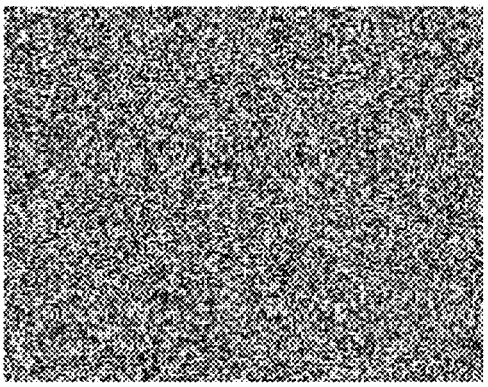
Figure 10:
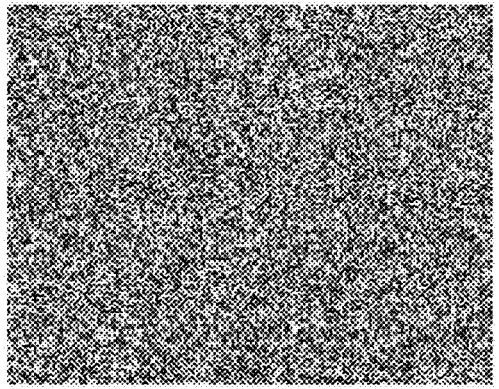
Figure 10:
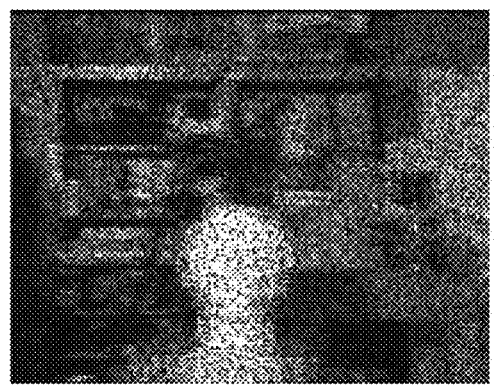
Figure 11:
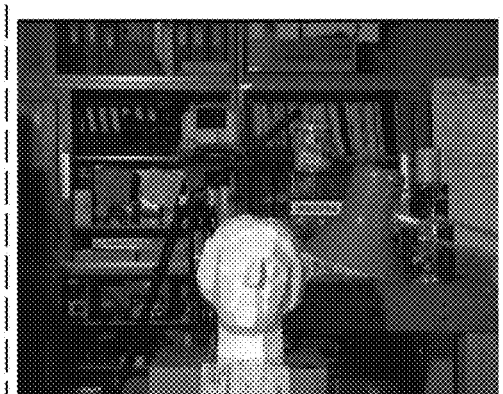
FIG. 11 illustrates an example of a simulation result according to the second embodiment.
Figure 11:
Figure 11:
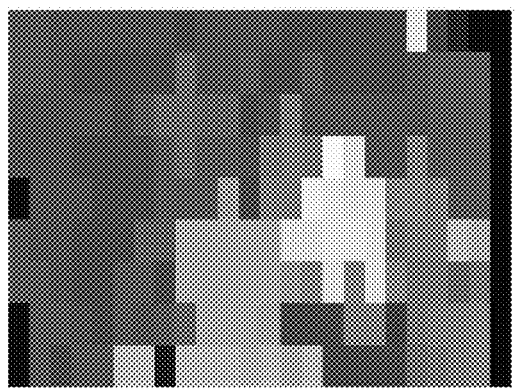
Figure 11:
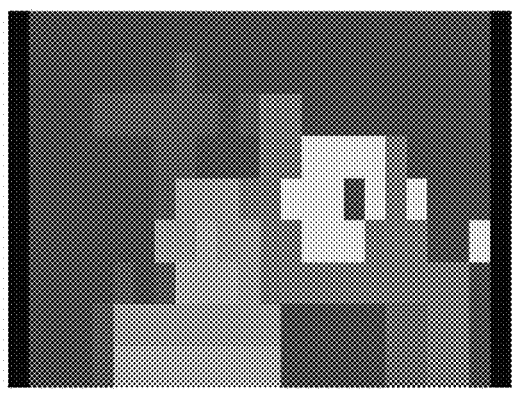

FIGS. 10 and 11 illustrate examples of a simulation result according to the second embodiment. Specifically, FIGS. 10 and 11 illustrate examples of a simulation result of processing in which two input images from different viewpoints obtained by the optical unit 100 of the imaging system 1 are superposed on each other and the distance is calculated from the superposed image obtained through such superposition.

The images illustrated in (a) and (b) of FIG. 10 are examples of the input images obtained by the two optical systems 101L and 101R, respectively. Since this is a simulation, these images are standard images, and each image is composed of 368×288 pixels=105984 pixels. The images illustrated in (c) and (d) of FIG. 10 are images of the modulation masks 12L and 12R, respectively. The image illustrated in (e) of FIG. 10 is an example of an observation image obtained by modulating the two input images illustrated in (a) and (b) of FIG. 10 with the modulation masks 12L and 12R illustrated in (c) and (d) of FIG. 10 and by superposing the modulated input images on each other. In this example, normally distributed random numbers are used for the optical transmittances at respective sites in each of the modulation masks 12L and 12R.

The images illustrated in (a) and (b) of FIG. 11 are examples of the reconstructed images $I_1'$ and $I_2'$, respectively, generated by the image generating unit 122 with the use of the expression (9). Here, the image generating unit 122 estimates the reconstructed images $I_1'$ and $I_2'$ and the parallax therebetween for each rectangular region composed of 16×32 pixels=512 pixels. This simulation result reveals that the image generating unit 122 can split the observation image illustrated in (e) of FIG. 10, or in other words, the superposed image into the two reconstructed images of different viewpoints. The image illustrated in (c) of FIG. 11 is an example of an image that indicates the parallax for each rectangular region calculated by the image generating unit 122 with the use of the expression (9). The image illustrated in (d) of FIG. 11 is an image that indicates the correct parallax. The gradation of black and white indicates the parallax in the images illustrated in (c) and (d) of FIG. 11. This simulation result reveals that the image generating unit 122 can obtain the parallax that is substantially equal to the correct parallax.

4. Advantageous Effects

As described thus far, in the second embodiment, in a similar manner to the first embodiment, two input images from mutually different viewpoints are superposed on each other on the single imaging device 13, the superposed image obtained by the imaging of the imaging device 13 is split, and thus the original two reconstructed images can be generated. Accordingly, in a similar manner to the first embodiment, the number of the imaging device 13 can be kept smaller than the number of the viewpoints, and the circuit size of the imaging unit 110 can advantageously be reduced.

Furthermore, in the second embodiment, when generating the reconstructed images $I_1'$ and $I_2'$, the image generating unit 122 uses the expression (9), which is an evaluation formula in which a parallax constraint that these two images are locally alike is added to the expression (8). The use of this evaluation formula to which such a parallax constraint is added makes it possible to obtain the reconstructed images $I_1'$ and $I_2'$ with less error, and the parallax D with less error can be calculated as a result. In other words, the accuracy in calculating the distance to the object can be improved.

In the second embodiment as well, in a similar manner to the first embodiment and the modification thereof, although the imaging apparatus 10 includes the two imaging optical systems 11L and 11R and the two modulation masks 12L and 12R, the number of the imaging optical systems and the number of the modulation masks are each not limited to two and merely need to be at least two. When the imaging apparatus 10 includes two or more imaging optical systems and two or more modulation masks, the image processing apparatus 20 generates two or more reconstructed images and calculates the parallax among these reconstructed images. Then, the image processing apparatus 20 calculates the distance to the object in the two or more reconstructed images on the basis of the calculated parallax.

Other Embodiments

Thus far, the imaging apparatus, the image processing apparatus, and the imaging system according to the present disclosure have been described on the basis of the first embodiment, the modification thereof, and the second embodiment, but the present disclosure is not limited to these embodiments and modifications thereof. Unless departing from the spirit of the present disclosure, an embodiment obtained by making various modifications that are conceivable by a person skilled in the art to the embodiments or an embodiment obtained by combining constituent elements in different embodiments may also be included within the scope of the present disclosure.

For example, the image processing apparatus 20 according to the first embodiment, the modification thereof, and the second embodiment described above may be configured as a computer.

Figure 12:
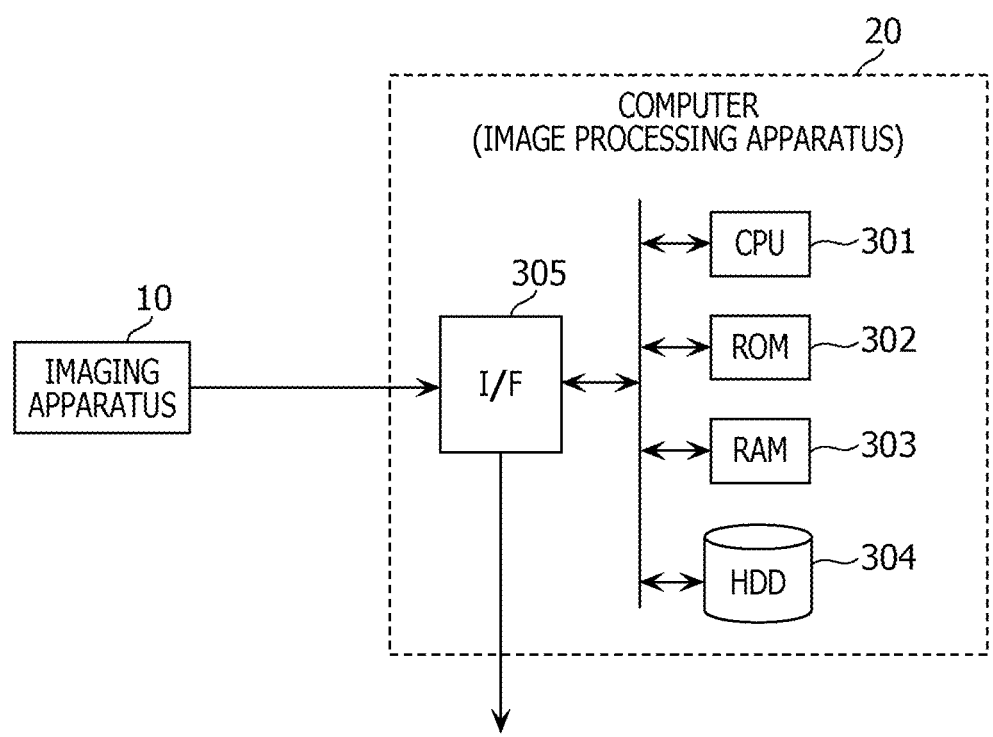
FIG. 12 is a block diagram illustrating a configuration of an image processing apparatus configured as a computer according to the present disclosure.

FIG. 12 is a block diagram illustrating a configuration of the image processing apparatus 20 configured as a computer.

The image processing apparatus 20 includes an interface 305, a central processing unit (CPU) 301, a read-only memory (ROM) 302, a random-access memory (RAM) 303, and a hard disk drive (HDD) 304. The interface 305 is a hardware piece that corresponds to the acquiring unit 21 and the distance output unit 124. The CPU 301 has a function of the image generating unit 122 and the distance calculating unit 123. The ROM 304 stores, for example, a software program to be loaded and executed by the CPU 301. In other words, the CPU 301 loads and executes the software program stored in the ROM 304 and thus implements the function of the image generating unit 122 and the distance calculating unit 123. The RAM 303 temporarily stores, for example, data generated through the processing of the CPU 301. The HDD 304 serves as the modulation information storing unit 121 and stores modulation information.

The optical systems 101L and 101R in the first embodiment, the modification thereof, and the second embodiment described above merely need to be arranged such that the parallax is produced between a plurality of images of an object the distance to which is to be measured and may be arranged horizontally or vertically.

In the first embodiment, the modification thereof, and the second embodiment, the number of the imaging optical systems, the number of the modulation masks, and the number of the input images are each two, but such numbers are not limited to two and can be any number that is at least two.

In the present disclosure, all or some of the units and the devices, or all or some of the functional blocks in the block diagrams illustrated in FIGS. 1 through 3 may be implemented by one or more electronic circuits including a semiconductor device, a semiconductor integrated circuit (IC), or a large scale integration (LSI). The LSI or the IC may be integrated into a single chip or may be constituted by a combination of a plurality of chips. For example, functional blocks other than a memory device may be integrated into a single chip. The name an LSI or an IC is used herein, but such a chip may also be called a system LSI, a very large scale integration (VLSI), or an ultra large scale integration (ULSI) depending on the degree of integration. A field-programmable gate array (FPGA) that can be programmed after manufacturing an LSI or a reconfigurable logic device that allows reconfiguration of the connection within the LSI or setup of circuit cells within the LSI can also be used for the same purpose.

Furthermore, all or some of the functions or the operations of the units, the devices, and a portion of the devices can be implemented through software processing. In this case, the software is recorded on one or more non-transitory recording media such as a ROM, an optical disk, or a hard disk drive, and when the software is executed by a processor, the software causes the processor and the peripheral devices to execute specific functions within the software. A system or an apparatus may include such one or more non-transitory recording media on which the software is recorded, a processor, and any necessary hardware devices such as an interface.

The image processing apparatus 20 in the first embodiment, the modification thereof, and the second embodiment described above generates two or more reconstructed images by splitting a superposed image but may calculate the distance to the object without generating the two or more reconstructed images.

In this case, the image processing apparatus 20 is configured as a range-finding apparatus and includes the acquiring unit 21 and the image processing unit 22, as illustrated in FIG. 1. The acquiring unit 21 acquires a superposed image composed of two or more input images from mutually different viewpoints that have been modulated and optically superposed on each other. The image processing unit 22 calculates the parallax between the two or more reconstructed images by using the modulation information that indicates the mode of the modulation of the two or more input images and the superposed image and calculates the distance to the object in the two or more reconstructed images on the basis of the calculated parallax.

Although the imaging apparatus, the image processing apparatus, and the imaging system according to an aspect of the present disclosure have been described with the use of the first embodiment, the modification thereof, and the second embodiment, the present disclosure may also be an imaging method and an image processing method to be implemented by these apparatuses or systems.

Figure 13A:
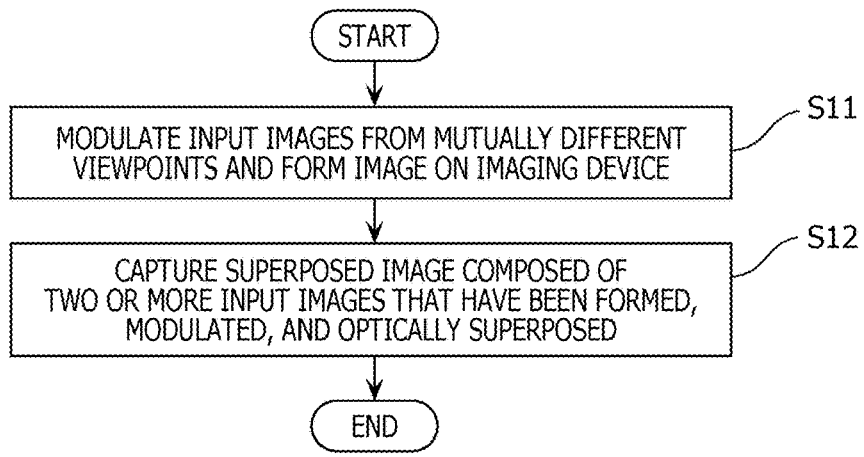
FIG. 13A is a flowchart illustrating an imaging method according to an aspect of the present disclosure.

FIG. 13A is a flowchart illustrating an imaging method according to an aspect of the present disclosure.

The imaging method according to an aspect of the present disclosure includes step S11 and step S12.

Step S11

In this imaging method, first, with the use of the two or more imaging optical systems and the two or more modulation masks, two or more input images from mutually different viewpoints are modulated and imaged on the imaging device 13.

Step S12

Then, the imaging device 13 captures a superposed image composed of the two or more input images that have been formed, modulated, and optically superposed on each other.

Figure 13B:
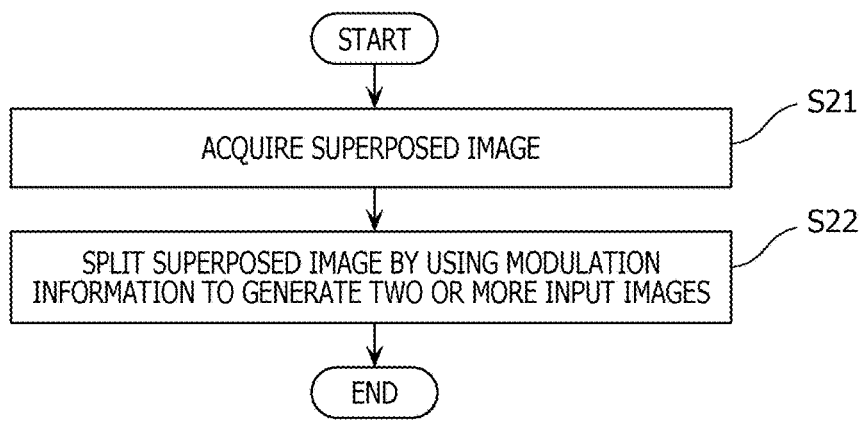
FIG. 13B is a flowchart illustrating an image processing method according to an aspect of the present disclosure.

FIG. 13B is a flowchart illustrating an image processing method according to an aspect of the present disclosure.

The image processing method according to an aspect of the present disclosure includes step S21 and step S22.

Step S21

In this image processing method, first, a superposed image composed of two or more input images from mutually different viewpoints that have been modulated and optically superposed on each other is acquired.

Step S22

Then, two or more reconstructed images are generated by splitting the superposed image with the use of modulation information that indicates the mode of modulation of the two or more input images.

Figure 13C:
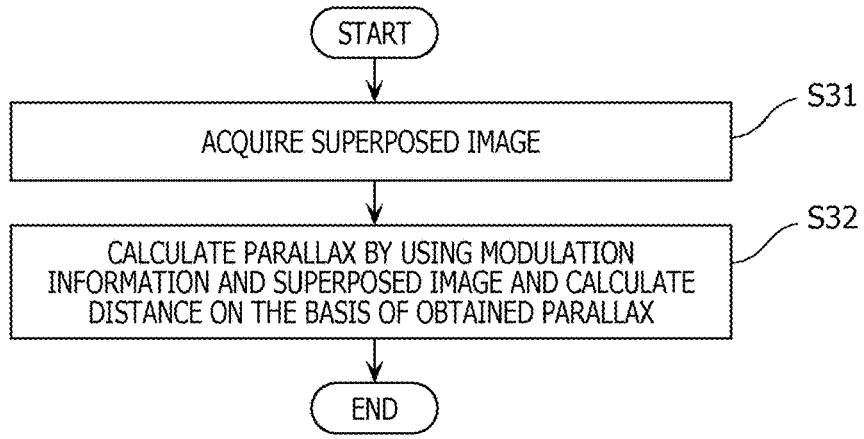
FIG. 13C is a flowchart illustrating an image processing method according to another aspect of the present disclosure.

FIG. 13C is a flowchart illustrating an image processing method according to another aspect of the present disclosure.

The image processing method according to another aspect of the present disclosure includes step S31 and step S32.

Step S31

In this image processing method, first, a superposed image composed of two or more input images from mutually different viewpoints that have been modulated and optically superposed on each other is acquired.

Step S32

Then, the parallax between the two or more input images is calculated by using modulation information that indicates the mode of modulation of the two or more input images and the superposed image and calculates the distance to the object in the two or more input images on the basis of the calculated parallax.

In each of the embodiments described above, each constituent element may be constituted by a dedicated hardware piece or may be implemented by executing a software program suitable for each constituent element. Each constituent element may be implemented as a program executing unit, such as a CPU or a processor, loads and executes a software program recorded on a recording medium, such as a hard disk or a semiconductor memory. Here, the software program that implements the image processing apparatus and so on of the embodiments described above is a program that causes a computer to execute the steps in the flowcharts illustrated in FIG. 13B or 13C.

The imaging apparatus according to the present disclosure provides an advantageous effect that the circuit size can be reduced and can be applied, for example, to a rear-view monitor or the like to be mounted in a vehicle.

What is claimed is:

1. An image processing apparatus, comprising:
   an acquirer that acquires a superposed image, wherein
      two or more imaging optical systems form respective input images from mutually different viewpoints,
      two or more modulation masks modulate the input images in modulation modes and output resulting images, and
      an imaging device receives the resulting images at a same time and generates the superposed image composed of the input images; and
   an image processor that generates reconstructed images corresponding to the input images by splitting the superposed image with the use of modulation information that indicates the modulation modes,
   wherein the modulation modes are different,
   wherein, when generating the two or more reconstructed images, the image processor
      calculates a parallax between the two or more reconstructed images along with the two or more reconstructed images on the basis of an evaluation value, and
      calculates a distance to an object in the two or more reconstructed images on the basis of the calculated parallax,
   wherein, when generating the two or more reconstructed images, the image processor
      calculates a value of a first parameter corresponding to the two or more reconstructed images and a value of a second parameter corresponding to the parallax that minimize the evaluation value, the evaluation value being based on the first parameter and the second parameter, converts the calculated value of the first parameter to the two or more reconstructed images, and acquires the calculated value of the second parameter as the parallax, wherein the evaluation value is a sum of respective values indicated by a first term, a second term, and a third term, wherein the first term indicates, by using the first parameter, a sum of squares of a difference between the superposed image and images obtained by modulating the two or more reconstructed images in accordance with the modulation information, wherein the second term indicates a value obtained by weighting an L1-norm of the first parameter, and wherein the third term indicates, by using the first parameter and the second parameter, a value obtained by weighting an L1-norm of a difference between an image obtained by translating one of the two or more reconstructed images by a distance corresponding to the parallax and another one of the two or more reconstructed images.

* * * * *